(12) United States Patent
Zhao et al.

(10) Patent No.: US 10,875,401 B2
(45) Date of Patent: Dec. 29, 2020

(54) COVER PLATE CONTROL DEVICE AND AUTOMOBILE

(71) Applicant: CEBI ELECTROMECHANICAL COMPONENTS (SHANGHAI) CO., LTD., Shanghai (CN)

(72) Inventors: Huifeng Zhao, Shanghai (CN); Mingqian Long, Shanghai (CN); Lei Fang, Shanghai (CN); Vanzini Andrea, Shanghai (CN); Jiazheng Shen, Shanghai (CN)

(73) Assignee: CEBI ELECTROMECHANICAL COMPONENTS (SHANGHAI) CO., LTD., Shanghai (CN)

( * ) Notice: Subject to any disclaimer, the term of this patent is extended or adjusted under 35 U.S.C. 154(b) by 70 days.

(21) Appl. No.: 16/096,577

(22) PCT Filed: Jan. 3, 2017

(86) PCT No.: PCT/CN2017/000009
§ 371 (c)(1),
(2) Date: Oct. 25, 2018

(87) PCT Pub. No.: WO2017/190520
PCT Pub. Date: Nov. 9, 2017

(65) Prior Publication Data
US 2019/0135105 A1    May 9, 2019

(30) Foreign Application Priority Data
May 4, 2016    (CN) .......................... 2016 1 0289364

(51) Int. Cl.
*B60K 15/04*    (2006.01)
*B60K 15/05*    (2006.01)
*E05B 47/00*    (2006.01)

(52) U.S. Cl.
CPC .......... *B60K 15/05* (2013.01); *B60K 15/0409* (2013.01); *E05B 47/0002* (2013.01);
(Continued)

(58) Field of Classification Search
CPC ................ B60K 15/05; B60K 15/0409; B60K 2015/0416; B60K 2015/0538;
(Continued)

(56) References Cited

U.S. PATENT DOCUMENTS 5,936,500 A    8/1999    Martus et al.
6,318,771 B1    11/2001    Holloway et al.
(Continued)

FOREIGN PATENT DOCUMENTS

CN    1203864 A    1/1999
CN    2751122 Y    1/2006
(Continued)

OTHER PUBLICATIONS

International Search Report dated Mar. 31, 2017 for PCT/CN2017/000009 and English translation.

*Primary Examiner* — Gregory A Blankenship
(74) *Attorney, Agent, or Firm* — Lucas & Mercanti, LLP

(57) ABSTRACT

This invention provides a kind of fuel filler cap actuator and automotive vehicle, comprising screw shaft, rotor, housing, first reset spring, lock block and lock block driving device; Under the action of the lock block driving device, the lock block can be rotated between the locking angle and the unlocking angle; the lock block driving device adopts an electromagnetic drive method to drive the lock block. This avoids the use of a motor drive, and achieves locking/unlocking of the fuel filler cap through the mutual interaction of the first and second magnet, which significantly reduce operational costs and increase life expectancy.

10 Claims, 11 Drawing Sheets

(52) U.S. Cl.
CPC ............... *B60K 2015/0416* (2013.01); *B60K 2015/0425* (2013.01); *B60K 2015/0538* (2013.01); *B60K 2015/0569* (2013.01)

(58) Field of Classification Search
CPC .... B60K 2015/0569; B60K 2015/0425; E05B 47/0002; E05B 47/0005
USPC ..................................................... 296/97.22
See application file for complete search history.

(56) References Cited

U.S. PATENT DOCUMENTS

| | | | |
|---|---|---|---|
| 10,443,277 B2* | 10/2019 | Basavarajappa | E05C 19/022 |
| 2009/0307869 A1* | 12/2009 | Salice | E05C 19/022 |
| | | | 16/85 |
| 2011/0174102 A1* | 7/2011 | Beck | E05C 19/022 |
| | | | 74/110 |
| 2015/0108131 A1* | 4/2015 | Malskorn | B60K 15/0406 |
| | | | 220/295 |
| 2016/0348408 A1* | 12/2016 | Watanabe | E05C 19/028 |
| 2019/0093392 A1* | 3/2019 | Schwab | E05B 81/06 |
| 2019/0135105 A1* | 5/2019 | Zhao | E05B 47/0002 |
| 2019/0184819 A1* | 6/2019 | Kato | B60K 15/05 |
| 2019/0264475 A1* | 8/2019 | Hirano | E05B 63/22 |

FOREIGN PATENT DOCUMENTS

| | | |
|---|---|---|
| CN | 105946571 A | 9/2016 |
| DE | 4422557 C1 | 1/1996 |
| EP | 1410936 A2 | 4/2004 |
| EP | 1495898 A1 | 1/2005 |

\* cited by examiner

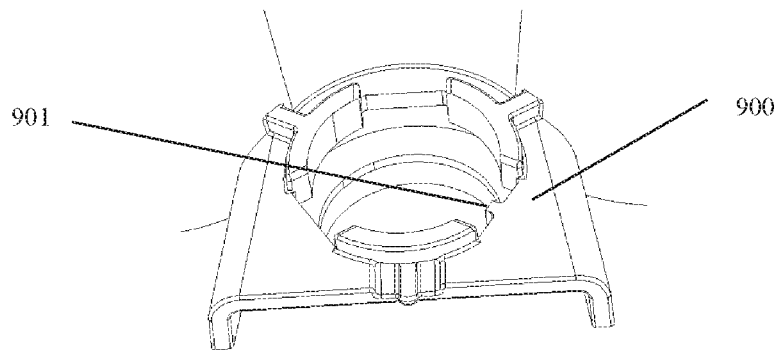
Figure 20
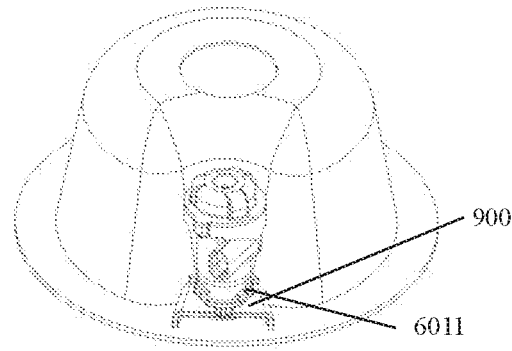
Figure 21
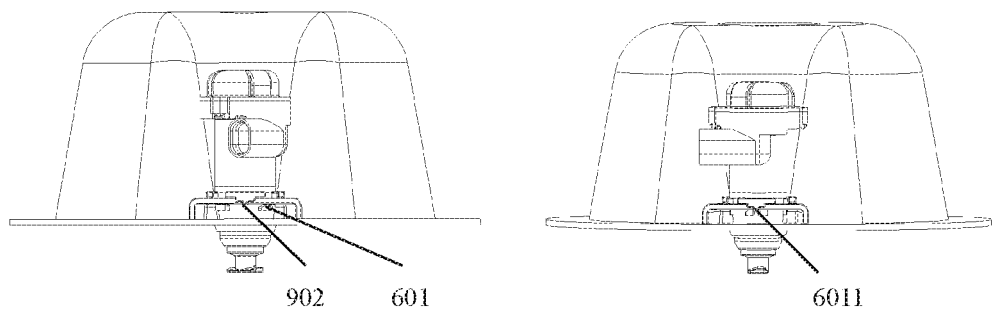
Figure 22
Figure 23

US 10,875,401 B2

COVER PLATE CONTROL DEVICE AND AUTOMOBILE

CROSS REFERENCE TO RELATED APPLICATION

This Application is a 371 of PCT/CN2017/000009 filed on Jan. 3, 2017 which, in turn, claimed the priority of Chinese Patent Application No. 201610289364.5 filed on May 4, 2016, both applications are incorporated herein by reference.

TECHNOLOGY FIELD

This invention involves automotive and electrical technologies as well as electronic components; specifically, fuel filler cap actuator and automotive vehicles, in particular fuel filler cap actuators.

BACKGROUND OF THE INVENTION

The fuel filler cap actuator is installed on the inside of the cap of the fuel tank. Its function is to lock/unlock the fuel filler cap and pop open/bring in the fuel filler cap.

There are mainly three known types of fuel filler cap actuators as listed below:

The first type is a controller which can both pop open/bring in and lock/unlock the fuel filler cap. The effect of this type of product is similar to this invention. However, as the locking and unlocking of the product is motor-driven, there is a higher demand for the number of cycles generated within the action set of locking/unlocking as well as there being higher requirements for the motor. As motors can be highly complex in structure, they are prone to mechanical issues; their lifespan may not satisfy the product's needs which in turn places limits on the lifespan of product usage. The parts are also large in size, heavy in weight and high-cost. Such products are less stable and effective in comparison to our invention.

The second type is an actuator which can only lock/unlock the fuel filler cap. In a linear fashion, a worm drive propels the force of a DC motor and pushes the lock pin into the keyhole, which proceeds to lock the fuel filler. The second type of actuator, when installed on its own, often requires additional designs to make up for missing functions, such as installing a spring/flap. Such types of structures are susceptible to many uncontrollable factors which may cause safety issues. Other fuel filler caps may contain a slot where the cap of the filler can be opened at the press of a finger. This can impact the aesthetics of the car itself. Some also resort to installing a third-party actuator, but the actual execution of its functions may be too complicated.

The third type is a fuel filler cap actuator which can only pop open the filler cap, offering a simple mechanical structure like those seen in a retractable ball pen. The cap on this type of fuel filler cannot be locked and contains many safety concerns in its use. An automotive vehicle with such installations will usually have a secondary actuator, or there may be a key that can be used separately to unlock the cap and neck on the fuel filler once the user exits the car. This type of structure is typically seen in lower-end vehicles.

SUMMARY OF THE INVENTION

In order to offer a solution to the lack of perfection in prior art, the purpose of this invention is to provide an actuator for automobile fuel filler caps.

The actuator provided by this invention comprises a screw shaft, a rotor, the body of the device, first reset spring, comprising a lock block and a lock block driving device.

The housing comprises a guide sleeve; the screw shaft is installed inside the guide sleeve; the rotor connects to the lower half of the screw shaft.

The guide sleeve contains a deep guide slot and a shallow guide slot. Both the deep and the shallow guide slot extend upwards starting from the bottom half of the guide sleeve; the slot next to the deep and shallow guide slots contains a dedendum flank.

The top of the lock block comprises the addendum flank which corresponds to the dedendum flank.

The side of the rotor extends past the protruding block; the protruding block is located between the bottom of the guide sleeve and the top of the lock block.

The lower end of the first reset spring is to be affixed to the housing; the upper end of the first reset spring is to be affixed to the screw shaft.

Under the action of the lock block driving device, the lock block can be rotated between the locking angle and the unlocking angle.

As the lock block rotates to the locking angle, the distance or the shape of the gap between the dedendum flank and the addendum flank blocks the protruding block, preventing it from gliding between the deep guide slot and the shallow guide slot.

As the lock block rotates to the unlocking angle, the distance and the shape of the gap between the dedendum flank and the addendum flank allows the protruding block to glide between the deep guide slot and the shallow guide slot.

Preferably, the lock block driving device comprises the first magnet; the second magnet is tightly affixed to the lock block.

Preferably, the first magnet comprises an electromagnet, the second magnet comprises a permanent magnet; the iron core of the electromagnet and the permanent magnet extend in the same circumferential direction.

Preferably, as the lock block rotates to the locking angle, the Height Dmin of the minimum axial clearance between the dedendum flank and the addendum flank is to be smaller than H, the maximum height of the protruding block;

As the lock block rotates to the unlocking angle, the Height Dmin of the minimum axial clearance between the dedendum flank and the addendum flank is to be greater than H, the maximum height of the protruding block. This allows the protruding block to pass through the minimum axial clearance so that it may glide between the deep guide slot and the shallow guide slot.

Preferably, along the circumference of the bottom of the guide sleeve, there are several gear units. Along the circumference of each set of gears are the first dedendum, the deep guide slot, the second dedendum, the shallow guide slot; the first dedendum and the second dedendum together form the dedendum flank;

A number of addendums are installed along the circumference of the top of the lock block; these addendums form the addendum flank;

The two adjacent flanks are referred to addendum A and addendum B, respectively; addendum A corresponds to the first addendum and the deep guide slot; addendum B corresponds to the second addendum and the shallow guide slot.

Preferably, as the lock block rotates to the locking angle, the space between the tip of the aforementioned addendum A and the tip of the first dedendum forms aforementioned the minimum axial clearance, with the tip of the aforementioned addendum B and the tip of the second dedendum forming aforementioned the minimum axial clearance;

When the lock block rotates to the unlocking angle, the aforementioned tips of addendum A are located beneath the place where the first addendum and the deep guide slot connect. The aforementioned tips of addendum B are located beneath the place where the second addendum and the shallow guide slot connect.

Preferably, this comprises an upper lid cover; a rotor; a lock block; a first reset spring; a screw shaft, all surrounding the axial column of the upper lid cover;

The rotor is affixed onto the buckle located at the bottom of the screw shaft; the buckle is affixed on the axial column of the upper lid cover.

Preferably, this comprises the following:

A stop lock and a second reset spring: the bottom end of the second reset spring is fastened with respect to the housing, and the upper end of the second reset spring is connected to a stop lock. The stop lock is located below the lock block. When the screw shaft is rotated relative to the guide sleeve to the lowest position on the axial stroke, the downward pressure on the stop lock disengages it from the lock block. When the screw shaft is rotated relative to the guide sleeve to the highest position on the axial stroke, the stop lock is disengaged, and the second reset spring presses the stop lock against the lock block.

A micro switch; the transmission component of the micro switch is triggered when the screw shaft is rotated relative to the guide sleeve to the lowest position on the axial stroke, connecting the micro switch to the power supply circuit of the lock block driving device; the transmission component of the micro switch is disengaged when the screw shaft is rotated relative to the guide sleeve to the highest position on the axial stroke, disconnecting the micro switch to the power supply circuit of the lock block driving device.

Preferably, this comprises: a mounting bracket and a housing assembled on the mounting holes of the mounting bracket.

Several sets of position locking components can be found on the housing, with at least one of these sets of position locking components comprising two positioning lock blocks; there is a gap between these two positioning lock blocks.

The wall with mounting holes is provided with alignment blocks which correspond to the gaps; a convex buckle can be found on one side or on both sides of the mounting bracket; these two positioning lock blocks clamp onto the convex buckle to lock in the connection.

Wherein, the convex buckle and the alignment block can be found at different locations of the circumferential direction.

An automotive vehicle provided in this invention, comprising aforementioned fuel filler cap actuator.

In comparison to prior art, this invention has the following advantages.

1. This invention uses a simple machine mechanism to carry out the locking and unlocking of the fuel filler cap, with said functions being relatively dependable.

2. In the preferred embodiment of this invention, the lock block driving device uses an electromagnetic drive style clamping mechanism, avoiding the use of an electrical motor drive, by means of using the effect of a first magnet (preferably an electromagnet) and a second magnet (preferably a permanent magnet) to carry out locking and unlocking of the fuel filler cap. In this way, costs are significantly reduced and the life expectancy is greatly increased.

3. In the unlock state the lock block is rotated to the unlocking angle, and the screw shaft may therefore spring up due to pressure. In the locked state, the lock block is in the locked angle, and the screw shaft cannot spring upwards after press, indicating the rotor and screw shaft rotate and connect together. When the screw shaft is depressed the rotor moves in step, and after touching the lock block, it stops. After pressure is released, the screw shaft and the rotor return to their original positions, the screw shaft will not then spring upwards, and the fuel filler cap will be locked.

BRIEF DESCRIPTION OF THE DRAWINGS

The additional characteristics, goals, and advantages will become more obvious upon consultation and reading of the following explanations of embodiment(s) of the invention, which are neither exhaustive nor restrictive.

FIG. 20 is a three-dimensional structural diagram of the mounting bracket.

FIG. 21 is a structural diagram showing the alignment between the gap between the two positioning lock blocks on the housing and the alignment blocks of the mounting bracket.

FIG. 22 is a structural diagram of when the gap between the two positioning lock blocks on the housing moves axially below the alignment blocks of the mounting bracket.

FIG. 23 is a structural diagram of when the gap between the two positioning lock blocks on the housing is axially rotated to engage with the convex buckle of the mounting bracket.

In the diagrams:

```
100-Screw shaft
101-Lock bolt
102-Buckle
103-Rotary guide slot
200-Rotor
201- Protruding block
300-Lock block
301-Addendum flank
3011-Addendum
401-Electromagnet
402-Permanent magnet
500-Stop lock
600-Housing
601-Positioning lock block
6011- Gap between adjacent positioning lock blocks
602-Metal electrode
603-Guide sleeve
6031-Deep guide slot
6032-Shallow guide slot
6033-Dedendum flank
60331-First dedendum
60332-Second dedendum
701-First reset spring
702-Second reset spring
800-Upper lid cover
900-Mounting bracket
901-Alignment block
902- Convex Buckle
```

DESCRIPTION OF THE PREFERRED EMBODIMENTS

The invention will now be described in detail in connection with specific embodiments. The following embodiments will help technical personnel in the field to further understand the invention without restricting the invention in any way. It should be pointed out that several changes and improvements can be made by those skilled in the art without breaking away from the original concept of the invention. These are within the scope of the protection of this invention.

Figure 1:
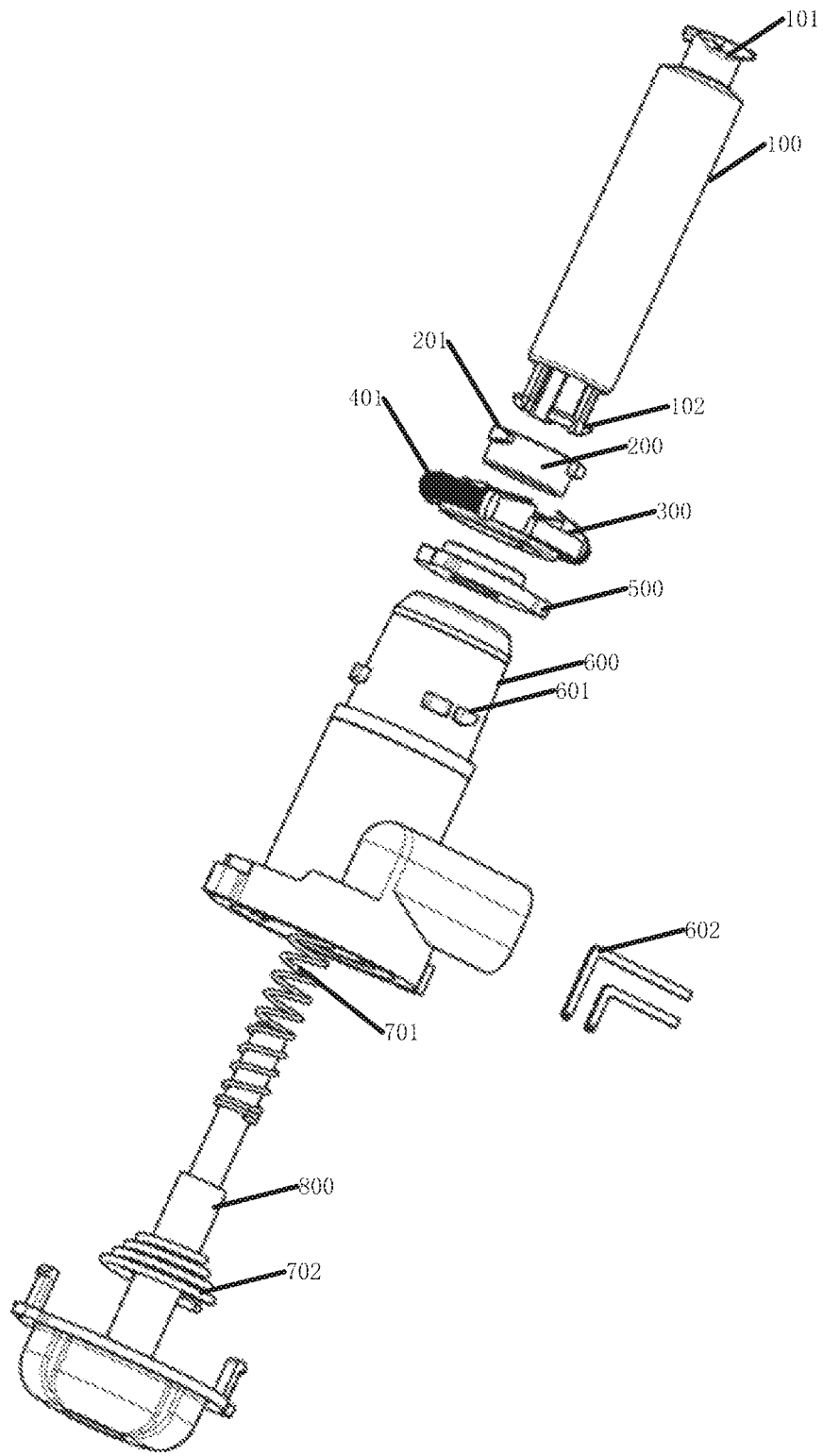
FIG. 1 is the exploded view of the fuel filler cap actuator.
Figure 2:
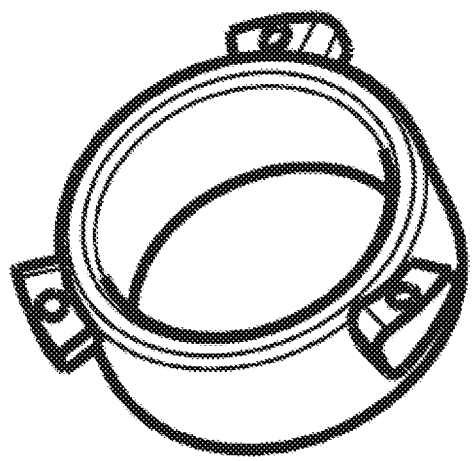
FIG. 2 is a three-dimensional structural image of the rotor.

As shown in FIG. 1 and other drawings in the manual, the fuel filler cap actuator provided according to this invention comprises a screw shaft 100, a rotor 200, a housing 600 and a first reset spring 701. It also comprises a lock block 300 and a lock block driving device. The screw shaft 100 comprises a lock bolt 101. The housing 600 comprises a guide sleeve 603. The screw shaft 100 is installed inside the guide sleeve 603. The rotor 200 is connected to the lower part of the screw shaft 100. The guide sleeve 603 is fitted with a deep guide slot 6031 and shallow guide slot 6032, and both the deep guide slot 6031 and the shallow guide slot 6032 start to extend upwards from the lower end of the guide sleeve 603. Between the slots adjacent to the deep guide slot 6031 and the shallow guide slot 6032 is the dedendum flank 6033. The top of lock block 300 comprises an addendum flank 301 opposite to the dedendum flank 6033. The side surface of rotor 200 extends out of the protruding block 201 as shown on FIG. 2. The side surface of the rotor 200 extends radially outward from the protruding block 201. The protruding block 201 has an upper inclined surface and a lower inclined surface located below the upper inclined surface. The upper inclined surface matches the dedendum flank 6033, and the lower inclined surface matches the addendum flank 301, so that the protruding block 201 can slide along the addendum flank 301 and the dedendum flank 6033. The protruding block 201 is located between the bottom of the guide sleeve 603 and the upper surface of the lock block 300. The lower end of the first reset spring 701 is fixed relative to the housing 600, and the upper end of the first reset spring 701 is coupled to the screw shaft 100.

The lock block 300 can rotate between the locking angle and the unlocking angle, driven by the lock block driving device. When the lock block 300 rotates to the locked angle, the gap between the dedendum flank 6033 and the addendum flank 301, is too small to block the protruding block 201, stopping the protruding block 201 from sliding between the deep guide slot 6031, and the shallow guide slot 6032. When the lock block 300 rotates to the locking angle, the gap between the dedendum flank 6033 and the addendum flank 301 is enough to allow the protruding block 201 to slide between the deep guide slot 6031 and the shallow guide slot 6032.

The guide sleeve 603 can be a separate component that fits into the housing 600. It can also be a component that extends from the inner wall of the housing 600. In other words, the housing 600 is an integrated component, and the guide sleeve 603 is a part of the integrated component. There are various ways of installing the screw shaft 100 and the guide sleeve 603. For example, the side wall of the screw shaft 100 has a rotary guide slot 103 matched with a guide boss. The inner wall of the guide sleeve 603 is fitted with a guide boss, and the guide boss sits within the rotary guide slot 103. The screw shaft 100 can be spirally rotated by the guide boss and the rotary guiding slot 103 acting together. In other methods, the rotary guide slot 603 may be installed in the inner wall of the guide boss, and the matching guide boss is set above the screw shaft.

The fuel filler cap actuator described further comprises an upper lid cover 800, a stop lock 500, and a second reset spring 702. The rotor 200, lock block 300, first reset spring 701, and screw shaft 100 all surround the central axial column of the upper lid cover 800. The rotor 200 is set on the buckle 102 at the lower part of the screw shaft 100. The buckle 102 is set on the central axis column of the upper lid cover 800. The lower end of the second reset spring 702 is a fixed end with respect to the housing 600, and the upper end of the second reset spring 702 is connected to the stop lock 500. The stop lock 500 sits below the lock block 300. When the screw shaft 100 is spirally moved relative to the guide sleeve 603 to the lowest position on the axial stroke, the downward pressure on the stop lock 500 disengages it from the lock block 300. When the screw shaft 100 is spirally moved relative to the guide sleeve 603 to the highest position on the axial stroke, the stop lock 500 is disengaged, and the second reset spring 702 presses the stop lock 500 against the lock block 300. In another variant, the stop lock 500, the second reset spring 702 is replaced by a micro switch. When the screw shaft 100 is spirally moved relative to the guide sleeve 603 to the lowest position on the axial stroke, the transmission component of the micro switch is triggered, connecting the micro switch with the power supply circuit of the lock block driving device. When the screw shaft 100 is spirally moved relative to the guide sleeve 603 to the highest position on the axial stroke, the transmission component of the micro switch is disconnected, so that the micro switch can cut off the power supply circuit of the lock block driving device or turn on the power supply circuit with the reverse current direction.

Figure 3:
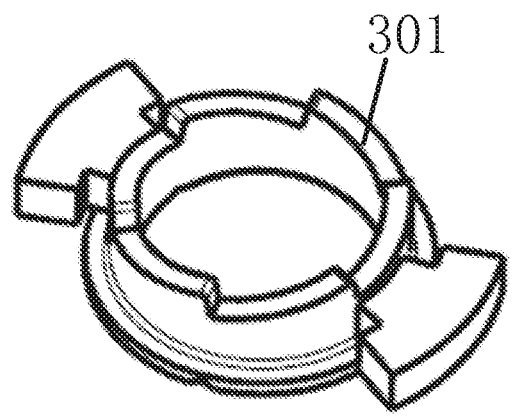
FIG. 3 is a three-dimensional structural image of the upper surface of the lock block.
Figure 4:
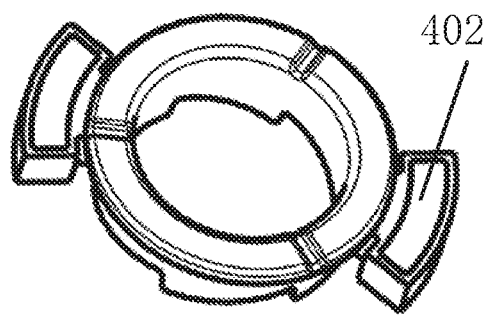
FIG. 4 is a three-dimensional structural image of the lower surface of the lock block.
Figure 5:
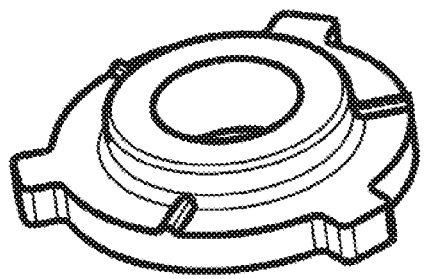
FIG. 5 is a three-dimensional structural image of the stop lock.
Figure 6:
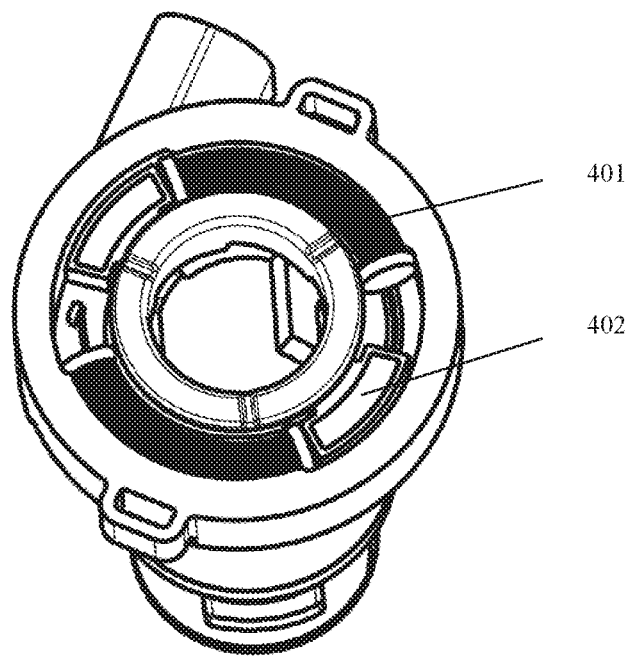
FIG. 6 is a three-dimensional structural image of the housing and the lock block driving device.
Figure 7:
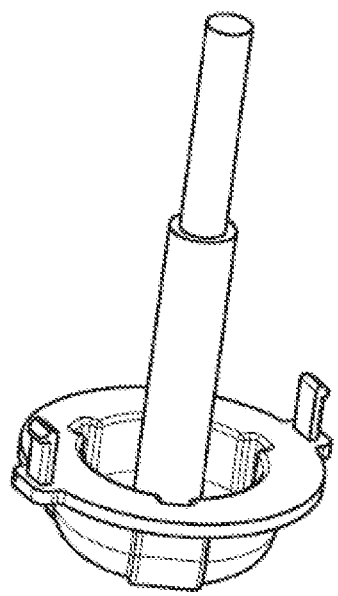
FIG. 7 is a three-dimensional structural image of the upper lid cover.
Figure 16:
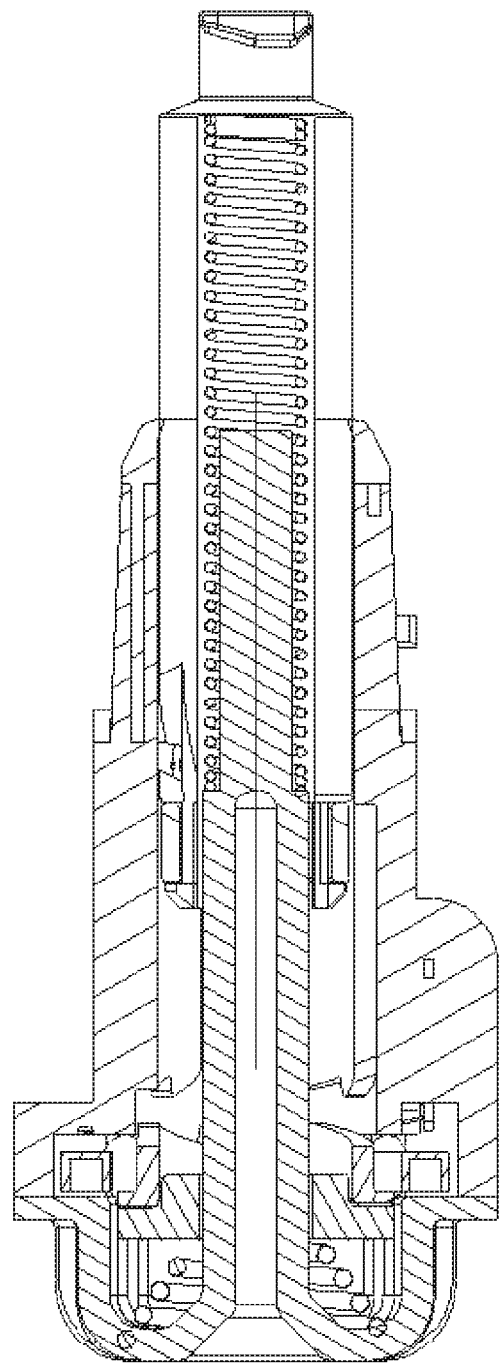
FIG. 16 is a cross-sectional diagram of the screw shaft being lifted to cause the convex buckle of the lock block to enter the deep guide slot.
Figure 17:
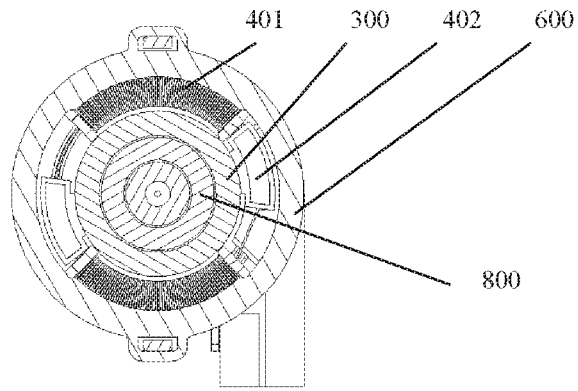
FIG. 17 is a structural diagram of when the lock block is at the locking angle.
Figure 18:
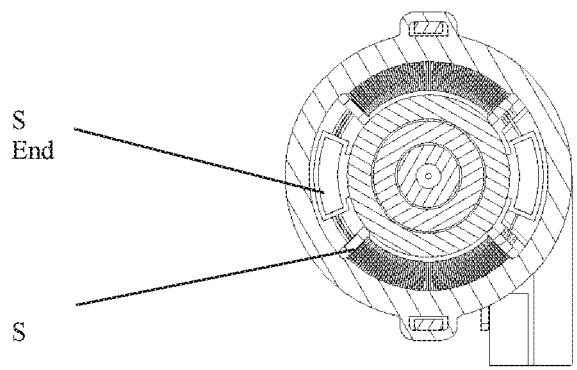
FIG. 18 is a structural diagram of when the lock block rotates from the locking angle to the unlocking angle.
Figure 19:
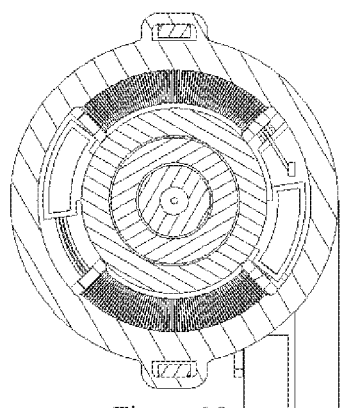
FIG. 19 is a structural diagram of when the lock block rotates to the unlocking angle.

Furthermore, the lock block driving device comprises a first magnet; and a second magnet is fastened to the lock block 300. As shown in FIG. 3 and FIG. 4, the first magnet comprises an electromagnet 401, and the second magnet comprises a permanent magnet 402. The core of the electromagnet 401 and the permanent magnet 402 extend along the same circumference. In the first preferred embodiment, as shown in FIGS. 16 to 18, when the electromagnet 401 is not powered, the permanent magnet 402 attracts the iron core in the electromagnet 401, thereby keeping the lock block 300 at the locking angle. When the electromagnet 401 is powered, the electromagnet 401 applies a repulsive force to the permanent magnet 402 that was originally attracted to push the permanent magnet 402, thereby driving the lock block 300 to rotate to the unlocking angle. Among them, the lock block 300 can be reset to the locking angle from the unlocking angle after the electromagnet 401 is de-energised by the reset spring, and a reverse current can be passed through the electromagnet 401 to push the lock block 300 back to the locking angle. In the second preferred embodiment, when the electromagnet 401 is not powered, the permanent magnet 402 attracts the iron core in electromagnet 401, thereby holding lock block 300 at the unlocking angle. When the electromagnet 401 is powered, the electromagnet 401 applies a repulsive force to the permanent magnet 402 that was originally attracted to push the permanent magnet 402, thereby driving the lock block 300 to rotate to a locking angle. In the first preferred embodiment, the first magnet comprises a permanent magnet and the second magnet comprises an electromagnet. In the second preferred embodiment, the first magnet and the second magnet each use an electromagnet, and a current is passed through the coil of the electromagnet in a non-passing direction, so that a repulsive force or an attractive force can be generated between the first magnet and the second magnet.

Figure 12:
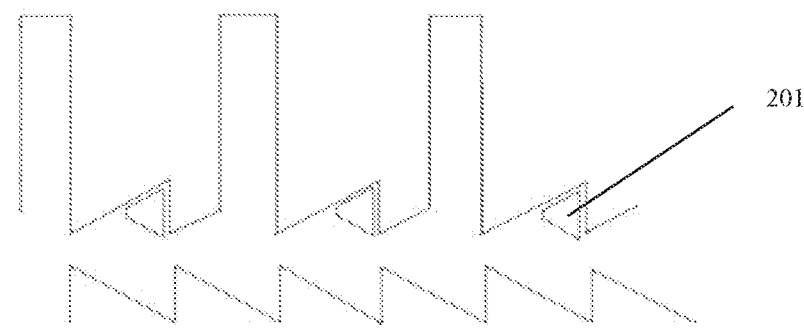
FIG. 12 is an expanded structural diagram of the lower surface of the guide sleeve, the rotor, and the addendum flank on the lock block when the lock block is at the locking angle.
Figure 13:
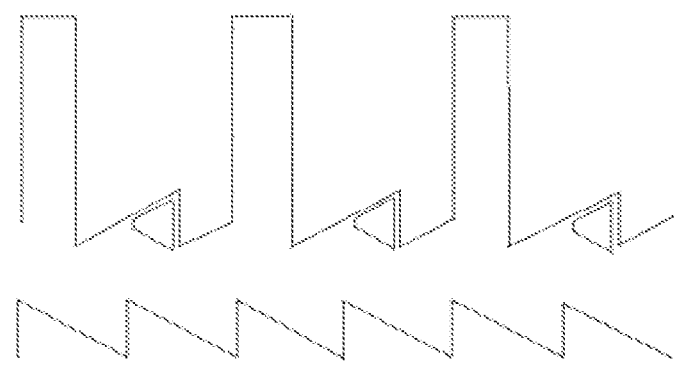
FIG. 13 is an expanded structural diagram of the lower surface of the guide sleeve, the rotor, and the addendum flank on the lock block when the lock block is at the unlocking angle.

More specifically, when the lock block 300 is rotated to the locking angle, as shown in FIG. 12, the height Dmin of the minimum axial clearance between the dedendum flank 6033 and the addendum flank 301 is less than or equal to the maximum height H of protruding block 201. When the lock block 300 is rotated to the unlocking angle, as shown in FIG. 13, the height Dmin of the minimum axial clearance between the dedendum flank 6033 and the addendum flank 301 is greater than the maximum height H of protruding block 201, so that the protruding block 201 can slide through the minimum axial clearance between the deep guide slot 6031 and the shallow guide slot 6032.

Figure 14:
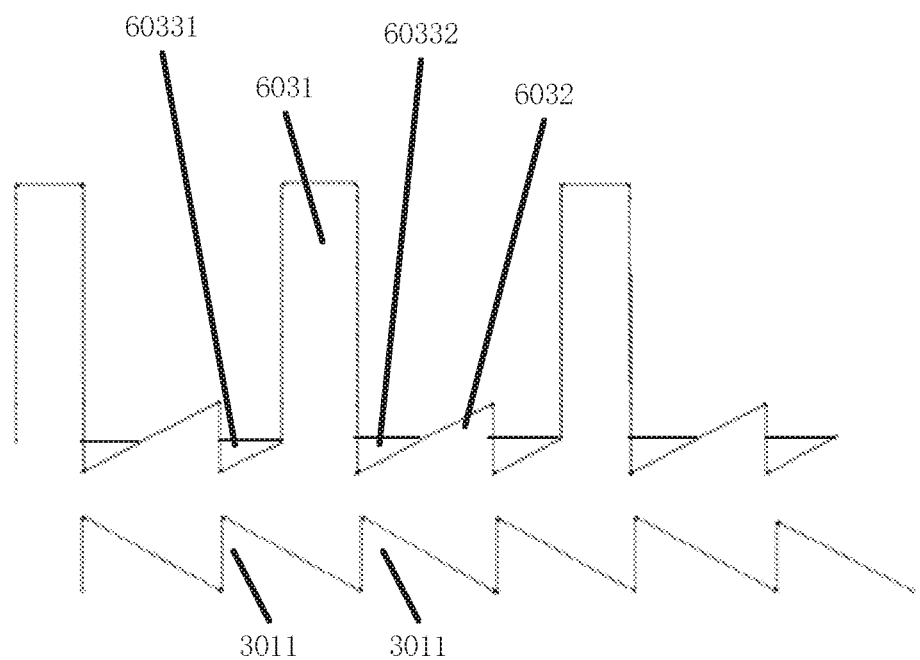
FIG. 14 is a schematic diagram showing the interaction between the first dedendum, the second dedendum, and the addendum.

As shown in FIG. 14, the bottom surface of the guide sleeve 603 has several sets of gear units in the circumferential direction; the first addendum 60331, deep guide slot 6031, the second dedendum 60332, shallow guide slot 6032 are sequentially set in the circumferential direction of each of the gear units. The first dedendum 60331 and the second dedendum 60332 form a dedendum flank 6033. The upper surface of the lock block 300 is fitted with several addendums 3011 along the circumferential direction. The addendums 3011 form an addendum flank 6031. The two adjacent addendums 3011 are respectively referred to as addendum A and addendum B. Addendum A corresponds to the first dedendum 60331 and the deep guide slot 6031, and addendum B corresponds to the second dedendum 60332 and the shallow guide slot 6032.

When the lock block 300 is rotated to the locking angle, a minimum axial clearance is formed between the tip of addendum A and the tip of the first dedendum 60331, and a minimum axial clearance is formed between the tip of addendum B and the tip of the second dedendum 60332. When the lock block 300 is rotated to the unlocking angle, the tip of addendum A is located directly below the junction of the first dedendum 60331 and the deep guide slot 6031, and the tip of addendum B is located directly below the junction of the second dedendum 60332 and the shallow guide slot 6032.

Furthermore, as shown in FIG. 20 to FIG. 23, the fuel filler cap actuator further comprises a mounting bracket 900. The housing 600 is assembled in a mounting hole of the mounting bracket 900. The housing 600 is fitted with a number of sets of position locking components (for example, set 1, set 2, or set 3), at least two position lock blocks 601 are included in a group of position locking components, and there is a gap between the two position lock blocks 601. Preferably, only one set of position locking components comprises two position lock blocks 601, and each of the remaining groups of position locking components has only one position locking block. A alignment block 901 matching the gap is fitted on the wall of the mounting hole, and a convex buckle 902 is fitted on one side or both sides of the mounting bracket 900. The two position lock blocks 601 clamp the protruding convex buckle 902 in order to lock the connection. Among them, convex buckle 902 and the alignment block 901 are located at different positions in the circumferential direction.

This invention also presents an automotive vehicle. Said vehicle comprises the fuel filler cap actuator described. For example, the fuel filler cap actuator is connected to the control for the fuel filler cap or the charging port cover of the automobile.

Working Principles:

Suppose that initially, the fuel filler cap is closed, the lock block 300 is at the locking angle, and the protruding block 201 of rotor 200 is located in the shallow guide slot 6032. The fuel filler cap cannot be opened from the outside, i.e., the fuel filler cap is locked in the closed state. At this time, the fuel filler cap keeps the screw shaft 100 depressed, causing the screw shaft 100 to depress the stop lock 500, and the stop lock 500 detaches from the lock block 300, as show in FIG. 14. As a result, the lock block may rotate between the locking angle and the unlocking angle.

Figure 8:
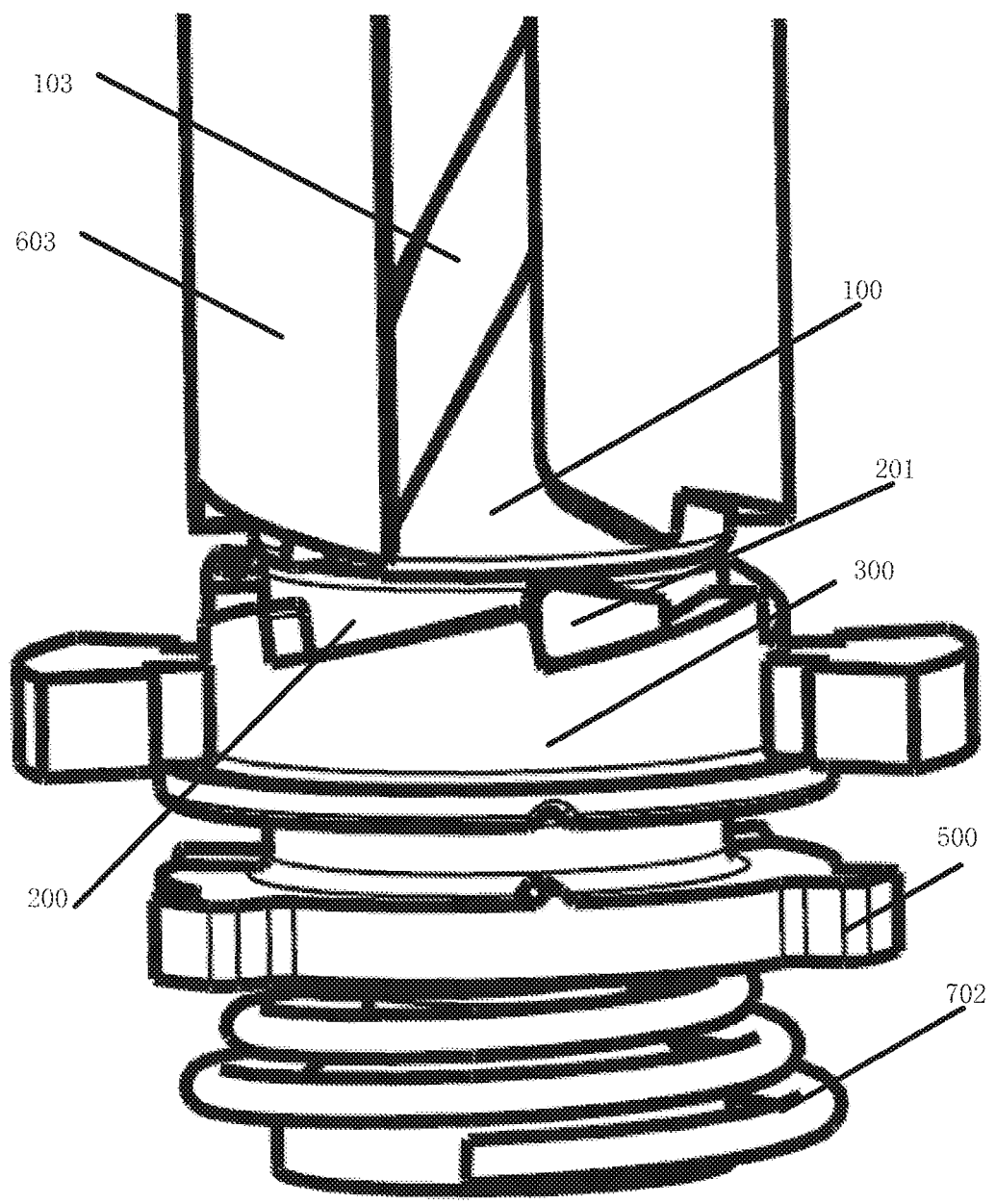
FIG. 8 is a schematic diagram of the rotor being pressed down between the two addendums of the lock block when the lock block is at the unlocking angle.
Figure 9:
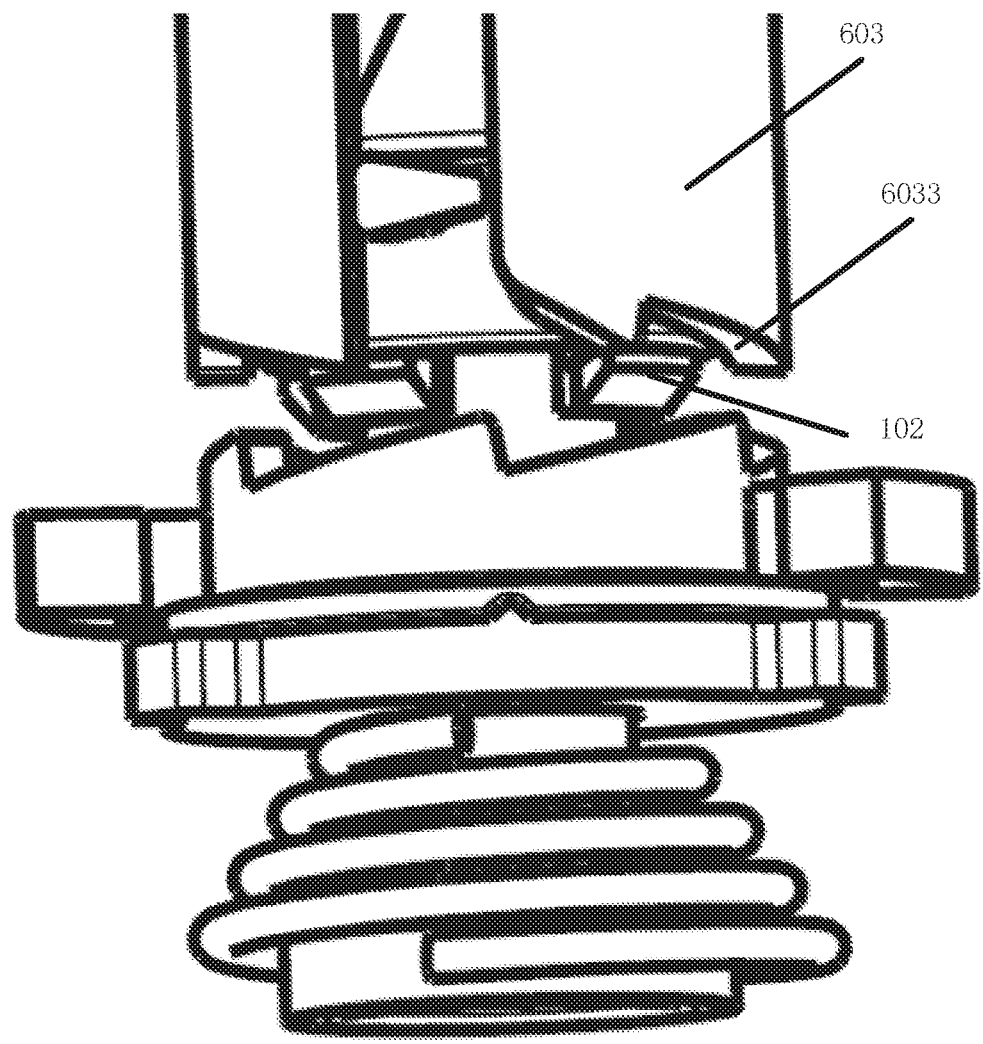
FIG. 9 is a schematic diagram of the rotor projecting into the deep guide slot when the lock block is at the unlocking angle.
Figure 10:
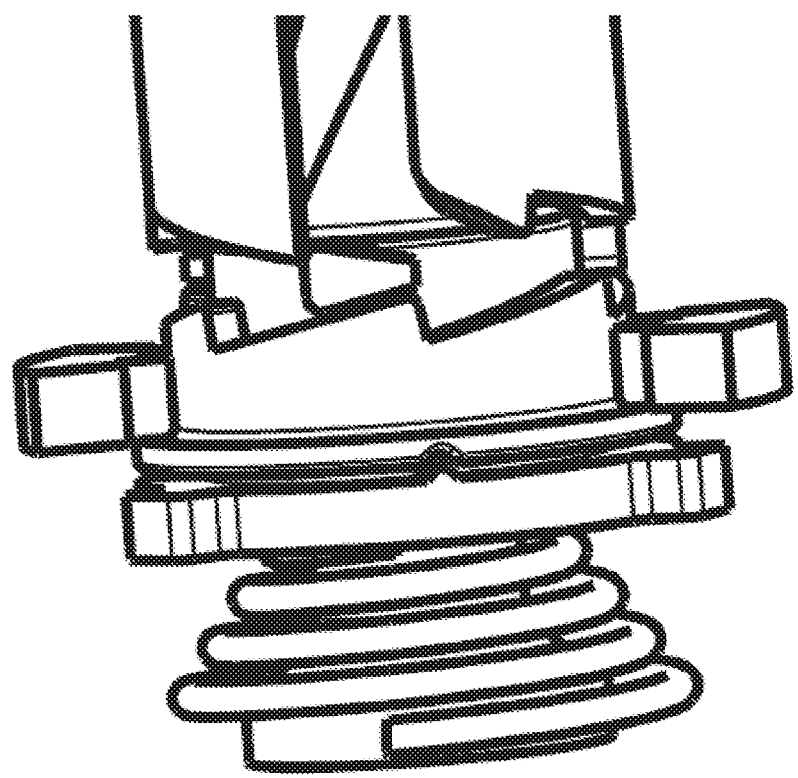
FIG. 10 is a schematic diagram of the rotor being pressed down, just touching the addendum flank of the lock block when the lock block is at the unlocking angle.
Figure 15:
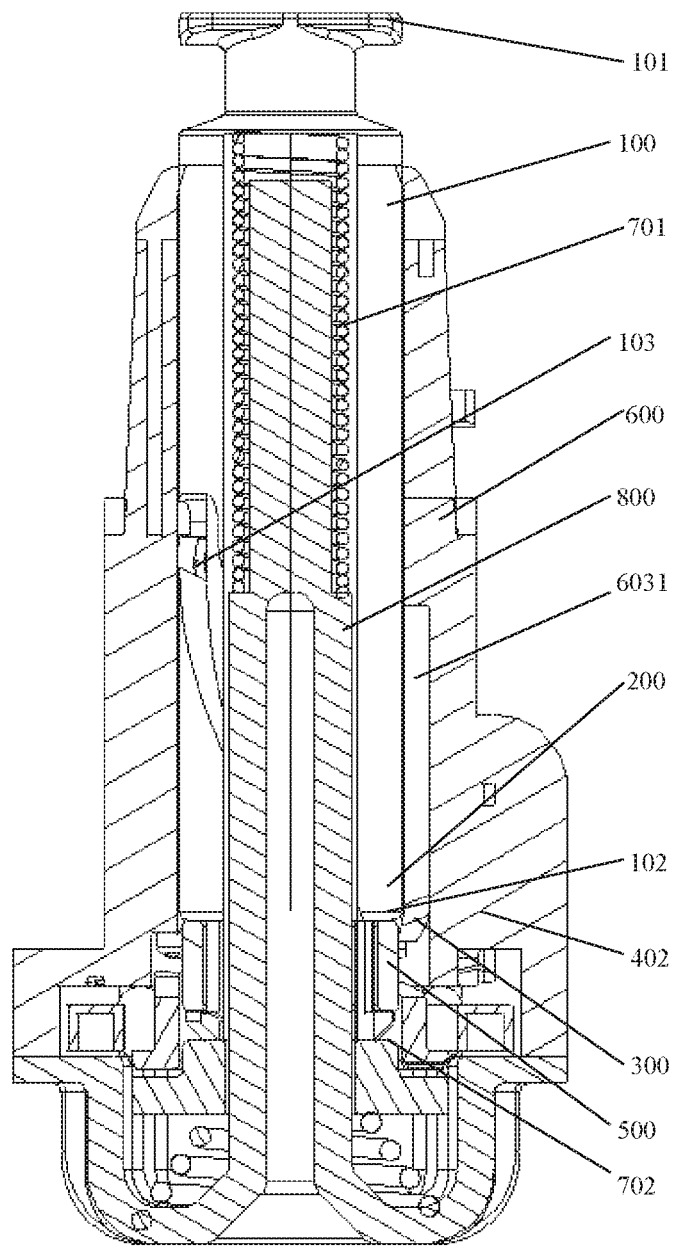
FIG. 15 is a cross-sectional view of the screw shaft pressing the lock block to release the stop lock from the lock block.

When it is necessary to open the fuel filler cap, electricity is supplied to the electromagnet 401, so that repulsive force is generated between magnetic poles of the same sign between the electromagnet 401 and the permanent magnet 402. As a result, rotation of the lock block 300 from the locking angle to the unlocking angle is driven by the permanent magnet 402. From the outside, a user may press the fuel filler cap, with this pressing being a continuous motion. In order to explain even more clearly the working principles of this invention, here the continuous motion of pressing shall be separated into multiple steps which shall be individually explained, with the results being: in the starting state the lid cover is depressing the screw shaft and when a user first presses down this causes the lid cover to depress the screw shaft 100 a little more, causing the protruding block 201 of the rotor 200 to move down from the shallow guide slot 6032 to the addendum flank 301, when the user continues to press down the lid cover, the lid cover will continue to depress the screw shaft 100, causing the protruding block 201 of the rotor 200 to move in a sliding motion along the direction of the tips of the addendum flank 301 towards the addendum base, directly attaching the protruding block 201 of the rotor 200 to the addendum base, as shown in FIG. 8. After releasing the lid cover, the first reset spring 701 produces an effect causing the screw shaft 100 to move upwards, driving the rotor 200 to move upwards at the same time, causing the protruding block 201 of the rotor 200 to move up from the addendum base of the addendum flank 301 to touch the first dedendum flank 60331, and to move in a sliding motion along the direction of the tips of the first dedendum flank 60331 towards the addendum base to enter the deep guide slot 6031, as shown in FIGS. 9 and 15.

After the protruding block 201 of the rotor 200 moves into a certain distance of the deep guide slot 6031, the screw shaft 100 will not continue to depress the stop lock 500, and after action by the second reset spring 702, the stop lock 500 will move directly upwards and become attached at the unlocking angle of the lock block 300. As a result, this will prevent incorrect operation during refilling (incorrect operation means engagement of the locking piece during the filling process resulting in movement to the locking angle, this incorrect operation may lead to an inability to close the lid cover after fuel filling and therefore must be prevented.)

Figure 11:
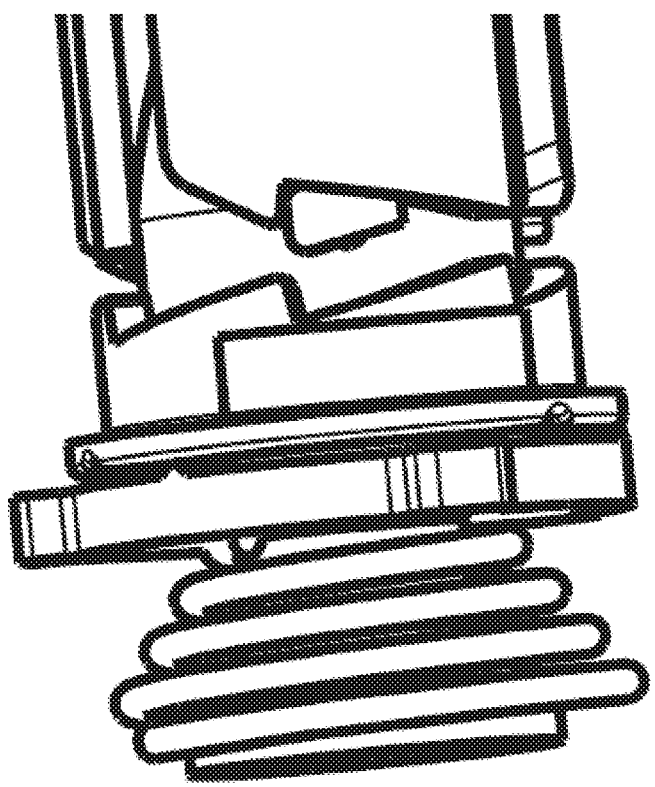
FIG. 11 is a schematic diagram of the rotor projecting into the shallow guide slot when the lock block is at the locking angle.

After filling is complete, the fuel filler cap is closed, the covering plate depresses the screw shaft 100, causing the stop lock 500 to separate from the lock block 300, and causing the electromagnet 401 to reverse electricity at a specific time causing the lock block 300 to rotate to the locked angle, with the electromagnet 401 thereafter losing electricity. As a result, a return is made to the initial state, as shown in FIG. 11.

The above is described as an embodiment example of the invention. It must be understood that this invention is not limited to the specific method detailed herein. Technical personnel working in this field may, within the scope of the claim of rights of the patent, make various kinds of changes or modifications, which do not influence the substantial content of this invention. If no conflict exists, the embodiments and features of the embodiments may be freely combined.

The invention claimed is:

1. A fuel filler cap actuator, comprising:
   a screw shaft,
   a rotor,
   a housing,
   a first reset spring,
   a lock block and
   a lock block driving device;
   wherein
   the housing comprises a guide sleeve;
   the screw shaft is mounted within the guide sleeve;
   the rotor is attached to a bottom of the screw shaft;
   the guide sleeve is provided with a deep guide slot and a shallow guide slot, the deep guide slot and the shallow guide slot both extend upwards beginning at a bottom of the guide sleeve;
   a dedendum flank is located in between openings of an adjacent deep guide slot and the shallow guide slot;
   a top of the lock block comprises an addendum flank which corresponds to the dedendum flank;
   a side of the rotor extends out of a protruding block;
   the protruding block is located between the bottom of the guide sleeve and the top of the lock block;
   a lower end of the first reset spring is affixed to the housing;
   an upper end of the first reset spring is attached to the screw shaft;
   under the action of the lock block driving device, the lock block can be rotated between a locking angle and an unlocking angle;
   while the lock block is rotated to the locking angle, a gap distance or a gap shape between the dedendum flank and the addendum flank blocks the protruding block, preventing the protruding block from sliding between the deep guide slot and the shallow guide slot;
   while the lock block is rotated to the unlocking angle, the gap distance or the gap shape between the dedendum flank and the addendum flank allows the protruding block to slide between the deep guide slot and the shallow guide slot.

2. The fuel filler cap actuator according to claim 1, wherein said lock block driving device comprises a first magnet; a second magnet is tightly affixed to the lock block.

3. The fuel filler cap actuator according to claim 2, wherein said first magnet comprises an electromagnet and said second magnet comprises a permanent magnet; the iron core of the electromagnet and the permanent magnet extend in a same circumferential direction.

4. The fuel filler cap actuator according to claim 1, wherein when the lock block is rotating towards the locking angle, a Height Dmin of the minimum axial clearance between the dedendum flank and the addendum flank is less than a maximum height H of the protruding block;
   as the lock block is rotated to the unlocking angle, the Height Dmin of the minimum axial clearance between the dedendum flank and the addendum flank is greater than H, the maximum height of the protruding block, this allows the protruding block to pass through the minimum axial clearance so that it may glide between the deep guide slot and the shallow guide slot.

5. The fuel filler cap actuator according to claim 1, wherein a circumference of the bottom of the guide sleeve is provided with several gear units, and along a circumference of each set of gears, are a first dedendum, the deep guide slot, a second dedendum, and the shallow guide slot; the first dedendum and the second dedendum together form the dedendum flank;
   a number of addendums are installed along a circumference of the top of the lock block; these addendums form the addendum flank;
   the two adjacent addendums are referred to addendum A and addendum B, respectively; addendum A corresponds to the first dedendum and the deep guide slot; addendum B corresponds to the second dedendum and the shallow guide slot.

6. The fuel filler cap actuator according to claim 5, wherein when the lock block rotates to the locking angle, a tip of the aforementioned addendum A is located directly at the bottom of a tip of the first dedendum, so as to form the aforementioned minimum axial clearance; a tip of the aforementioned addendum B is located directly at the bottom of a tip of the second dedendum, so as to form the aforementioned minimum axial clearance;
   as the lock block is rotated to the unlocking angle, the tip of the aforementioned addendum A is to be located at an immediate bottom of a point joining the first dedendum and the deep guide slot; the tip of the aforementioned addendum B is to be located at an immediate bottom of a point joining the second dedendum and the shallow guide slot.

7. The fuel filler cap actuator according to claim 1, further comprising an upper lid cover;
- the rotor, the lock block, a first reset spring and the screw shaft surround an axial column of the upper lid cover;
- the rotor is affixed onto a buckle located at a bottom of the screw shaft;
- the buckle is affixed on the axial column of the upper lid cover.

8. The fuel filler cap actuator according to claim 1, further comprising:
- a stop lock and a second reset spring;
- a bottom end of the second reset spring corresponds to a fixed end of the housing, with an upper end of the second reset spring connecting to the stop lock;
- the stop lock is located beneath the lock block;
- when the screw shaft is rotated relative to the guide sleeve to a lowest position on the axial stroke, a downward pressure on the stop lock disengages from the lock block;
- when the screw shaft is rotated relative to the guide sleeve to a highest position on the axial stroke, the stop lock is disengaged, and the second reset spring presses the stop lock against the lock block; or
- a transmission component of a micro switch is triggered when the screw shaft is rotated relative to the guide sleeve to the lowest position on the axial stroke, connecting the micro switch to a power supply circuit of the lock block driving device;
- the transmission component of the micro switch is disengaged when the screw shaft is rotated relative to the guide sleeve to the highest position on the axial stroke, disconnecting the micro switch to the power supply circuit of the lock block driving device.

9. The fuel filler cap actuator according to claim 1, further comprising a mounting bracket wherein the housing is mounted in a mounting hole on the mounting bracket;
- several sets of position locking components are on a top of the housing, with at least one of the several sets of position locking components comprising two positioning lock blocks wherein there is a gap between the two positioning lock blocks;
- a wall with mounting holes is provided with alignment blocks which correspond to the gaps;
- a convex buckle can be found on one side or on both sides of the mounting bracket; the two positioning lock blocks clamp onto the convex buckle to lock in a connection between the convex buckle and the two positioning lock blocks;
- wherein, the convex buckle and the alignment block can be found at different locations of the circumferential direction.

10. An automotive vehicle, which is comprising the fuel filler cap actuator according to claim 1 of this invention.

* * * * *